(12) United States Patent
Kim et al.

(10) Patent No.: US 11,302,324 B2
(45) Date of Patent: Apr. 12, 2022

(54) SPEECH PROCESSING METHOD AND APPARATUS THEREFOR

(71) Applicant: LG ELECTRONICS INC., Seoul (KR)

(72) Inventors: Ye Jin Kim, Seoul (KR); Hyun Yu, Seoul (KR); Byeong Ha Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 16/698,649

(22) Filed: Nov. 27, 2019

(65) Prior Publication Data
US 2021/0097990 A1    Apr. 1, 2021

(30) Foreign Application Priority Data
Oct. 1, 2019  (KR) .......................... 10-2019-0121843

(51) Int. Cl.
*G10L 15/22*    (2006.01)
*G10L 15/187*    (2013.01)
(Continued)

(52) U.S. Cl.
CPC ............ *G10L 15/22* (2013.01); *G10L 15/187* (2013.01); *G10L 25/78* (2013.01); *G10L 2015/088* (2013.01); *G10L 2015/223* (2013.01)

(58) Field of Classification Search
CPC ....... G10L 15/00; G10L 15/22; G10L 15/187; G10L 2015/088; G10L 2015/223; G10L 25/00; G10L 25/78
See application file for complete search history.

(56) References Cited

U.S. PATENT DOCUMENTS

2005/0267759 A1* 12/2005 Jeschke ............... B60R 16/0373
                                                                                      704/270
2007/0078642 A1*  4/2007 Weng .................. G10L 15/1822
                                                                                      704/4
(Continued)

FOREIGN PATENT DOCUMENTS

KR    10-0825690 B1    4/2008
KR    10-0918644 B1    9/2009

*Primary Examiner* — Huyen X Vo
*Assistant Examiner* — Sean E Serraguard
(74) *Attorney, Agent, or Firm* — Birch, Stewart, Kolasch & Birch, LLP

(57) ABSTRACT

Disclosed are a speech processing method and apparatus therefor which execute an installed artificial intelligence algorithm and/or machine learning algorithm to perform speech processing in a 5G communication environment. The speech processing method may include determining a temporary pause of reception of a first spoken utterance, outputting a first spoken response utterance as a result of speech recognition processing of a second spoken utterance received after the temporary pause, determining, as an extension of the first spoken utterance, a third spoken utterance received after outputting the first spoken response utterance, deleting a duplicate utterance part from a fourth spoken utterance that is obtained by combining the first and the third spoken utterance, when performing speech recognition processing on the fourth spoken utterance, and outputting a second spoken response utterance as a result of speech recognition processing of the fourth spoken utterance from which the duplicate utterance part has been deleted.

20 Claims, 6 Drawing Sheets

(51) Int. Cl.
*G10L 25/78* (2013.01)
*G10L 15/08* (2006.01)

(56) References Cited

U.S. PATENT DOCUMENTS

2014/0039895 A1\* 2/2014 Aravamudan ........ G06F 16/683
 704/257
2015/0348551 A1\* 12/2015 Gruber ................ H04M 3/4936
 704/235
2019/0180741 A1\* 6/2019 Park ........................ G10L 15/22

\* cited by examiner

SPEECH PROCESSING METHOD AND APPARATUS THEREFOR

CROSS-REFERENCE TO RELATED APPLICATION

This present application claims benefit of priority to Korean Patent Application No. 10-2019-0121843, entitled "SPEECH PROCESSING METHOD AND APPARATUS THEREFOR," filed on Oct. 1, 2019, in the Korean Intellectual Property Office, the entire disclosure of which is incorporated herein by reference.

BACKGROUND

1. Technical Field

The present disclosure relates to a speech processing method and a speech processing apparatus, and more particularly, to a speech processing method and a speech processing apparatus in which a delay that occurs during reception of a spoken utterance is recognized as an incomplete utterance and temporarily stored, a result of executing a speech recognition process on an additional spoken utterance received after the delay is provided, and then a spoken utterance inputted again and the spoken utterance from prior to the delay are recognized as a complete utterance, and a duplicate utterance part is deleted when executing a speech recognition process on the completed utterance.

2. Description of Related Art

As technology continues to advance, various services using speech recognition technology have been introduced in a number of fields in recent years. Speech recognition technology can be understood as a series of processes of understanding utterances spoken by a speaker and converting the spoken utterance to text data recognizable and usable by computers. Furthermore, speech recognition services using such speech recognition technology may include a series of processes for recognizing a user's spoken utterance and providing a service appropriate thereto.

Korean Patent Registration No. 10-0918644, (registered on Sep. 16, 2009, hereinafter referred to as "related art 1") discloses a conversation system and a conversation sentence generation method for generating a conversation sentence by collecting and interconnecting, in particular, actually used sentences and words when performing a direct conversation as a listener or speaker, and for outputting a sentence appropriate to a user's stance and a situation of a conversation counterpart through definition correction and extension of words.

Korean Patent Registration No. 10-0825690 (registered on Apr. 22, 2008, hereinafter referred to as "related art 2") discloses a method of correcting a recognition error in a speech recognition system. According to this method, an error included in a result of a speech recognizer can be automatically corrected, and the speech recognizer can be easily adapted to a new area.

In a device (for example, a speech recognition speaker) having the speech recognition functionality of related art 1 or related art 2, a delay may occur while a user makes an utterance towards the device. That is, the user may hesitate due to suddenly not being able to recall a word necessary for completing the utterance, or may search for the word through another route. The device may misrecognize the above delay as completion of the utterance, and may attempt to process the incomplete utterance, resulting in provision of an erroneous speech recognition process result.

It is natural that human beings temporarily pause while speaking and then continue to speak after checking necessary information when having a conversation. However, the above device is unable to differentiate between a temporary pause in an utterance and completion of an utterance.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY OF THE INVENTION

An aspect of the present disclosure is to address the shortcoming associated with some related art in which a delay that occurs during an utterance is misrecognized as completion of the utterance, and an attempt to process the incomplete utterance is made, resulting in provision of an erroneous speech recognition process result.

Another aspect of the present disclosure is to address the shortcoming associated with some related art in which a temporary pause in an utterance and completion of an utterance cannot be differentiated.

Another aspect of the present disclosure is to delete, when an additional spoken utterance for obtaining additional information is received during reception of a spoken utterance, a duplicate utterance part when providing a result of speech recognition processing of the spoken utterance and the additional spoken utterance.

Another aspect of the present disclosure is to address, using optimal process resources, the shortcoming associated with some related art in which a delay that occurs during an utterance is misrecognized as completion of the utterance, and an attempt to process the incomplete utterance is made, resulting in provision of an erroneous speech recognition process result.

Another aspect of the present disclosure is to address, using optimal process resources, the shortcoming associated with some related art in which a temporary pause in an utterance and completion of an utterance cannot be differentiated.

A speech processing method according to an embodiment of the present disclosure may include recognizing a delay that occurs during reception of a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part when performing speech recognition processing on the completed utterance.

More specifically, the speech processing method according to the present embodiment may include determining a temporary pause of reception of a first spoken utterance during reception of the first spoken utterance, outputting a first spoken response utterance as a result of speech recognition processing of a second spoken utterance received after the temporary pause separately from the first spoken utterance, determining, as an extension of the first spoken utterance, a third spoken utterance received after outputting the first spoken response utterance, deleting a duplicate utterance part from a fourth spoken utterance that is obtained by combining the first spoken utterance and the third spoken utterance, when performing speech recognition processing on the fourth spoken utterance, and outputting a second spoken response utterance as a result of speech recognition processing of the fourth spoken utterance from which the duplicate utterance part has been deleted.

Through the speech processing method according to the present embodiment, speech recognition processing performance may be improved by recognizing a delay that occurs during reception of a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part when performing speech recognition processing on the completed utterance.

The determining a temporary pause of reception of the first spoken utterance may include recognizing a temporary pause signal related to the reception of the first spoken utterance when a filled pause, as a non-linguistic element, is included in the first spoken utterance during reception of the first spoken utterance, and determining a temporary pause of the reception of the first spoken utterance on the basis of the recognition of the temporary pause signal.

The recognizing a temporary pause signal related to the reception of the first spoken utterance may include recognizing at least one word in the first spoken utterance, comparing the at least one word with words of a pre-established filled pause dictionary, and determining the at least one word as the temporary pause signal related to the reception of the first spoken utterance when the at least one word is the same as the words of the filled pause dictionary as a result of the comparison.

The determining a temporary pause of reception of the first spoken utterance may include determining the temporary pause of the reception of the first spoken utterance when a silent delay occurs for a preset time during reception of the first spoken utterance.

The determining a temporary pause of reception of the first spoken utterance may include determining the temporary pause of the reception of the first spoken utterance when a preset temporary pause determination keyword is included in the first spoken utterance during reception of the first spoken utterance.

The speech processing method according to the present embodiment may further include putting speech recognition processing for the first spoken utterance, which was received before the temporary pause, on standby, upon determination of the temporary pause of the reception of the first spoken utterance.

The deleting the duplicate utterance part from the fourth spoken utterance may include generating pronunciation sequences of the fourth spoken utterance, calculating a degree of similarity between the pronunciation sequences of the fourth spoken utterance, determining, as the duplicate utterance part, a pronunciation sequence part for which the degree of similarity between the pronunciation sequences of the fourth spoken utterance is equal to or greater than a reference degree of similarity, as a result of calculating the degree of similarity, and deleting the duplicate part from the pronunciation sequences of the fourth spoken utterance.

The calculating the degree of similarity may include calculating the degree of similarity between a first pronunciation sequence included in the first spoken utterance and a second pronunciation sequence included in the third spoken utterance, among the pronunciation sequences of the fourth spoken utterance.

The determining as the duplicate utterance part may include determining, as the duplicate utterance part, a pronunciation sequence part for which the degree of similarity between the first pronunciation sequence and the second pronunciation sequence is equal to or greater than the reference degree of similarity, as a result of calculating the degree of similarity.

The deleting the duplicate utterance part may include deleting the duplicate utterance part from either the first pronunciation sequence or the second pronunciation sequence.

A speech processing apparatus according to another embodiment of the present disclosure may include a first information processor configured to determine a temporary pause of reception of a first spoken utterance during reception of the first spoken utterance, a second information processor configured to output a first spoken response utterance as a result of speech recognition processing of a second spoken utterance received after the temporary pause separately from the first spoken utterance, a third information processor configured to determine, as an extension of the first spoken utterance, a third spoken utterance received after outputting the first spoken response utterance, a fourth information processor configured to delete a duplicate utterance part from a fourth spoken utterance that is obtained by combining the first spoken utterance and the third spoken utterance, when performing speech recognition processing on the fourth spoken utterance, and a fifth information processor configured to output a second spoken response utterance as a result of speech recognition processing of the fourth spoken utterance from which the duplicate utterance part has been deleted.

Through the speech processing apparatus according to the present embodiment, speech recognition processing performance may be improved by recognizing a delay that occurs during reception of a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part when performing speech recognition processing on the completed utterance.

The first information processor may be configured to, when determining the temporary pause of the reception of the first spoken utterance, recognize a temporary pause signal related to the reception of the first spoken utterance when a filled pause, as a non-linguistic element, is included in the first spoken utterance during reception of the first spoken utterance, and determine the temporary pause of the reception of the first spoken utterance on the basis of the recognition of the temporary pause signal.

The first information processor may be configured to, when recognizing the temporary pause signal related to the reception of the first spoken utterance, recognize at least one word in the first spoken utterance, compare the at least one word with words of a pre-established filled pause dictionary, and determine the at least one word as the temporary pause signal related to the reception of the first spoken utterance when the at least one word is the same as the words of the filled pause dictionary as a result of the comparison.

The first information processor may be configured to, when determining the temporary pause of the reception of the first spoken utterance, determine the temporary pause of the reception of the first spoken utterance when a silent delay occurs for a preset time during reception of the first spoken utterance.

The first information processor may be configured to, when determining the temporary pause of the reception of the first spoken utterance, determine the temporary pause of the reception of the first spoken utterance when a preset temporary pause determination keyword is included in the first spoken utterance during reception of the first spoken utterance.

The first information processor may be further configured to put speech recognition processing for the first spoken utterance, which was received before the temporary pause, on standby, upon determination of the temporary pause of the reception of the first spoken utterance.

The fourth information processor may be configured to, when deleting the duplicate utterance part from the fourth spoken utterance, generate pronunciation sequences of the fourth spoken utterance, calculate a degree of similarity between the pronunciation sequences of the fourth spoken utterance, determine, as the duplicate utterance part, a pronunciation sequence part for which the degree of similarity between the pronunciation sequences of the fourth spoken utterance is equal to or greater than a reference degree of similarity, as a result of calculating the degree of similarity, and delete the duplicate part from the pronunciation sequences of the fourth spoken utterance.

The fourth information processor may be configured to, when calculating the degree of similarity, calculate the degree of similarity between a first pronunciation sequence included in the first spoken utterance and a second pronunciation sequence included in the third spoken utterance, among the pronunciation sequences of the fourth spoken utterance.

The fourth information processor may be configured to, when determining as the duplicate utterance part, determine, as the duplicate utterance part, a pronunciation sequence part for which the degree of similarity between the first pronunciation sequence and the second pronunciation sequence is equal to or greater than the reference degree of similarity, as a result of calculating the degree of similarity.

The fourth information processor may be configured to, when deleting the duplicate utterance part, delete the duplicate utterance part from either the first pronunciation sequence or the second pronunciation sequence.

Apart from those described above, another method and another system for implementing the present disclosure, and a computer-readable recording medium having a computer program stored therein to perform the method may be further provided.

Other aspects and features in addition as those described above will become clear from the accompanying drawings, the claims, and the detailed description of the present disclosure.

According to the present disclosure, speech recognition processing performance may be improved by recognizing a delay that occurs while receiving a spoken utterance as an incomplete utterance and temporarily storing the spoken utterance, providing a result of speech recognition processing of an additional spoken utterance received after the delay, and then recognizing, as a complete utterance, a spoken utterance inputted again and the spoken utterance from prior to the delay, and deleting a duplicate utterance part result providing when performing speech recognition processing on the completed utterance.

Furthermore, the speech recognition processing performance may be improved by differentiating a temporary pause of an utterance and completion of an utterance.

Furthermore, the speech recognition processing performance may be improved by providing a result of speech recognition processing of both a spoken utterance and an additional spoken utterance in a state in which a speech recognition functionality is activated even when the additional spoken utterance for obtaining additional information is received while receiving the spoken utterance.

In addition, although the speech processing apparatus is a mass-produced product, the user may recognize the speech processing apparatus as a user-customized apparatus. Therefore, the speech processing apparatus may have effects of a user-customized apparatus.

Also, the present disclosure may increase user satisfaction by providing various services through speech recognition processing, and may perform the speech recognition processing rapidly and accurately.

In addition, voice commands intended by the user may be recognized and processed using only optimal processor resources, thus improving energy efficiency of the speech recognition device.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
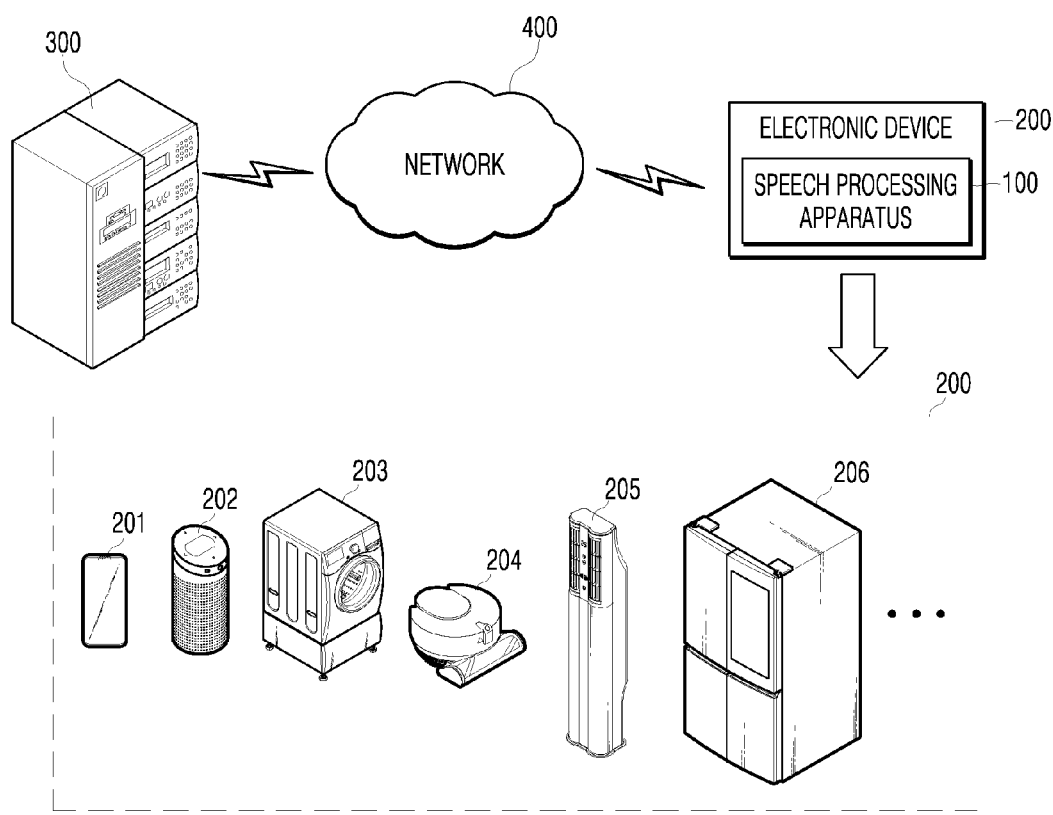
FIG. 1 is an exemplary diagram illustrating a speech processing environment including an electronic device having a speech processing apparatus according to an embodiment of the present disclosure, a server, and a network for connecting the foregoing elements.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular exemplary embodiments only and is not intended to be limiting. As used herein, the singular forms are intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally used only to distinguish one element from another.

Hereinafter, embodiments of the present disclosure will be described in detail with reference to the accompanying drawings. Like reference numerals designate like elements throughout the specification, and overlapping descriptions of the elements will be omitted.

FIG. 1 is an exemplary diagram illustrating a speech processing environment including an electronic device having a speech processing apparatus according to an embodiment of the present disclosure, a server, and a network for connecting the foregoing elements. Referring to FIG. 1, a speech processing environment 1 may include an electronic device 200 including a speech processing apparatus 100, a server 300, and a network 400. The electronic device 200 including the speech processing apparatus 100 and the server 300 may be connected to each other in a 5G communication environment.

The speech processing apparatus 100 may receive utterance information of a user, and may provide a speech recognition service through recognition and analysis. Here, the speech recognition service may include receiving the utterance information of the user to distinguish a wake-up word and a spoken utterance, and outputting a result of executing a speech recognition process on the utterance information so that the result may be recognized by the user.

In the present embodiment, the utterance information may include a wake-up word and a spoken utterance. The wake-up word may be a specific command that activates the speech recognition functionality of the speech processing apparatus 100. The speech recognition functionality is activated only when the wake-up word is present in the utterance information, and therefore, when the utterance information does not contain the wake-up word, the speech recognition functionality remains in an inactive state (for example, in a sleep mode). Such a wake-up word may be preset and stored in a memory (160 in FIG. 2) that will be described below.

Furthermore, the spoken utterance, which is processed after the speech recognition functionality of the speech processing apparatus 100 is activated by the wake-up word, may include a voice command that may be substantially processed by the speech processing apparatus 100 to generate an output. For example, when the utterance information of the user is "Hi LG, turn on the air conditioner", the wake-up word may be "Hi LG", and the spoken utterance may be "turn on the air conditioner". The speech processing apparatus 100 may determine presence of the wake-up word from the utterance information of the user, and may control an air conditioner 205, as the electronic device 200, by analyzing the spoken utterance.

In the present embodiment, in a state in which the speech recognition functionality is activated after receiving the wake-up word, the speech processing apparatus 100 may determine a temporary pause of reception of a first spoken utterance during reception of the first spoken utterance. The speech processing apparatus 100 may output a first spoken response utterance as a result of speech recognition processing of a second spoken utterance received after the temporary pause, separately from the first spoken utterance. The speech processing apparatus 100 may determine, as an extension of the first spoken utterance, a third spoken utterance received after outputting the first spoken response utterance. When performing speech recognition processing on a fourth spoken utterance obtained by combining the first spoken utterance and the third spoken utterance, the speech processing apparatus 100 may delete a duplicate utterance part from the fourth spoken utterance. The speech processing apparatus 100 may output a second spoken response utterance as a result of speech recognition processing of the fourth spoken utterance from which the duplicate utterance part has been deleted.

Here, the first spoken utterance may include a first voice command uttered by the user after uttering the wake-up word, and the first spoken utterance may include an incomplete spoken utterance. For example, referring to FIG. 4, the first spoken utterance may be "in the drama Iris".

The second spoken utterance may include a second voice command uttered after the temporary pause of the first spoken utterance is determined, and the second spoken utterance may include a complete spoken utterance. For example, referring to FIG. 4, the second spoken utterance may be "tell me the cast of the drama Iris".

The third spoken utterance may include a third voice command uttered by the user after the result of speech recognition processing of the second spoken utterance is outputted, and may include an incomplete spoken utterance as a voice command determined as an extension of the first spoken utterance. For example, referring to FIG. 4, the third spoken utterance may be "tell me the role of Kim Tae Hee in the drama Iris".

The fourth spoken utterance may include a complete spoken utterance obtained by combining the incomplete first spoken utterance and the incomplete third spoken utterance. For example, referring to FIG. 4, the fourth spoken utterance may be "in the drama Iris tell me the role of Kim Tae Hee in the drama Iris".

In the present embodiment, a complete spoken utterance may include a voice command (for example, referring to FIG. 4, "tell me the cast of the drama Iris") for which a speech recognition processing result is able to be outputted. Furthermore, an incomplete spoken utterance may include a voice command (for example, referring to FIG. 4, "in the drama Iris") for which a speech recognition processing result is unable to be outputted.

In the present embodiment, upon receiving a voice command, that is, a spoken utterance, from the user after entering a state in which the speech recognition functionality is activated having received the wake-up word from the user, the speech processing apparatus 100 may convert the received spoken utterance into a user text using an acoustic model (not illustrated) and a language model (not illustrated) stored therein. The speech processing apparatus 100 may perform syntactic analysis or semantic analysis on the converted text to recognize an intent of utterance. The speech processing apparatus 100 may generate, on the basis of the intent of utterance, a response text for the user text using a knowledge base. The speech processing apparatus 100 may generate a spoken response utterance as a result of converting the response text, which is a natural language utterance type, into speech. The speech processing apparatus 100 may output the spoken response utterance through an audio output interface (142 of FIG. 2).

In the present embodiment, the speech processing apparatus 100, which is in the speech recognition functionality activated state after having received the wake-up word, may output a speech recognition processing result by executing the speech recognition functionality by itself as described above, or may transfer a spoken utterance to the server 300, and may receive a speech recognition processing result from the server 300 and output the received speech recognition processing result.

In the present embodiment, the speech processing apparatus 100 may be included in the electronic device 200. The electronic device 200 may include various devices compatible with the Internet of things (IoT), such as a user terminal 201, an artificial intelligence speaker 202 serving as a hub for connecting other electronic devices to the network 400, a washing machine 203, a robot cleaner 204, the air conditioner 205, and a refrigerator 206. However, the electronic device 200 is not limited to the examples illustrated in FIG. 1.

The user terminal 201, among such electronic devices 200, may receive a service for driving or controlling the speech processing apparatus 100 through an authentication process after accessing a speech processing apparatus driving application or speech processing apparatus driving site. In the present embodiment, the user terminal 201 that completes the authentication process may drive the speech processing apparatus 100 and control the operation of the speech processing apparatus 100.

In the present embodiment, the user terminal 201 may be a desktop computer, smartphone, notebook, tablet PC, smart TV, mobile phone, personal digital assistant (PDA), laptop, media player, micro-server, global positioning system (GPS) device, electronic book terminal, digital broadcasting terminal, navigation, kiosk. MP3 player, digital camera, home appliance, and other mobile or immobile computing devices which are operated by an user, but is not limited thereto. In addition, the user terminal 201 may be a wearable terminal having a communication function and a data processing function, such as a watch, glasses, a hair band, and a ring. The user terminal 201 is not limited thereto. Any terminal that is capable of performing web browsing may be used without limitation.

The server 300 may be a database server that provides big data required for applying various artificial intelligence algorithms, and data used for operating the speech processing apparatus 100. Furthermore, the server 300 may include a web server or application server for remotely controlling the speech processing apparatus 100 by using a speech processing apparatus driving application or a speech processing apparatus driving web browser installed in the user terminal 201.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed. Specifically, machine learning may be a technology for researching and constructing a system for learning, predicting, and improving its own performance based on empirical data and an algorithm for the same. Machine learning algorithms, rather than only executing rigidly set static program commands, may take an approach that builds models for deriving predictions and decisions from inputted data.

The server 300 may generate the first spoken response utterance as a result of speech recognition processing of the second spoken utterance received from the speech processing apparatus 100, and may then transfer the first spoken response utterance to the speech processing apparatus 100. The server 300 may receive, from the speech processing apparatus 100, the fourth spoken utterance that is obtained by combining the first spoken utterance and the third spoken utterance, may generate the second spoken response utterance as a result of speech recognition processing of the fourth spoken utterance, and may then transfer the second spoken response utterance to the speech processing apparatus 100. When transferring the second spoken response utterance to the speech processing apparatus 100, the server 300 may transfer the second spoken response utterance after deleting a duplicate utterance part therefrom.

According to a processing capability of the speech processing apparatus 100, at least a portion of generation of the first spoken response utterance and generation of the second spoken response utterance which are performed by the server 300 may be performed by the speech processing apparatus 100.

The network 400 may serve to connect the electronic device 200 including the speech processing apparatus 100 and the server 300. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may send and receive information by using the short distance communication and/or the long distance communication. The short distance communication may include Bluetooth®, radio frequency identification (RFID), infrared data association (IrDA), ultra-wideband (UWB), ZigBee, and wireless fidelity (Wi-Fi) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include a connection of network elements such as a hub, a bridge, a router, a switch, and a gateway. The network 400 may include one or more connected networks, for example, a multi-network environment, including a public network such as an Internet and a private network such as a safe corporate private network.

The access to the network 400 may be provided via one or more wired or wireless access networks. Further, the network 400 may support 5G communications and/or an Internet of things (IoT) network for exchanging and processing information between distributed components such as objects.

Figure 2:
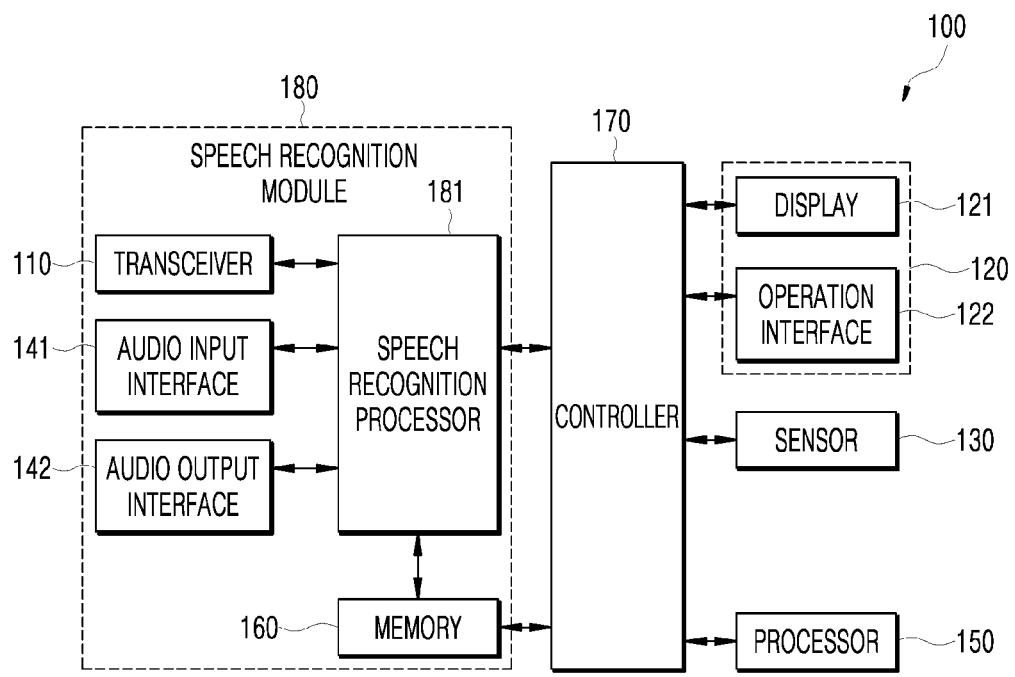
FIG. 2 is a schematic block diagram of a speech processing apparatus according to an embodiment of the present disclosure.

FIG. 2 is a schematic block diagram of a speech processing apparatus according to an embodiment of the present disclosure. Hereinafter, description overlapping with that of FIG. 1 will be omitted. Referring to FIG. 2, the speech processing apparatus 100 may include a transceiver 110, a user interface 120 including a display 121 and an operation interface 122, a sensor 130, an audio processor 140 including an audio input interface 141 and an audio output interface 142, an information processor 150, a memory 160, a controller 170, and a speech recognition processor 181. In this embodiment, the transceiver 110, the audio input interface 141, the audio output interface 142, the memory 160, and the speech recognition processor 181 may be included in the speech recognition module 180.

The transceiver 110 may interwork with the network 400 to provide a communication interface required for providing, in the form of packet data, transmission and reception signals among the speech processing apparatus 100 and/or the electronic device 200 and/or the server 300. Furthermore, the transceiver 110 may receive an information request signal from the user terminal 200, and transmit information processed by the speech processing apparatus 100 to the electronic device 200. Furthermore, the transceiver 110 may transmit the information request signal from the electronic device 200 to the server 300, receive a response signal processed by the server 300, and then transmit the response signal to the electronic device 200. Furthermore, the transceiver 110 may be a device including hardware and software required for transmitting and receiving signals such as a control signal and a data signal via a wired or wireless connection to another network device.

Furthermore, the transceiver 110 may support a variety of object-to-object intelligent communications, for example. Internet of things (IoT), Internet of everything (IoE), and Internet of small things (IoST), and may support, for example, machine to machine (M2M) communication, vehicle to everything (V2X) communication, and device to device (D2D) communication.

The display 121 of the user interface 120 may display a driving state of the speech processing apparatus 100 under control of the controller 170. Depending on the embodiment, the display 121 may form an inter-layer structure with a touch pad so as to be configured as a touch screen. Here, the display 121 may also be used as the operation interface 122 capable of inputting information through a touch of a user. To this end, the display 121 may be configured with a touch-sensitive display controller or other various input and output controllers. As an example, the touch recognition display controller may provide an output interface and an input interface between the device and the user. The touch recognition display controller may transmit and receive electric signals to and from the controller 170. Also, the touch recognition display controller may display a visual output to the user, and the visual output may include text, graphics, images, video, and a combination thereof. The display 121 may be a predetermined display member, such as a touch-sensitive organic light emitting display (OLED), liquid crystal display (LCD), or light emitting display (LED).

The operation interface 122 of the user interface 120 may have a plurality of operation buttons (not shown) to transmit signals corresponding to the buttons to the controller 170. This operation interface 122 may be configured with a sensor, button, or switch structure capable of recognizing a touch or pressing operation of the user. In this embodiment, the operation interface 122 may transmit to the controller 170 an operation signal operated by the user in order to check or modify various information regarding the operation of speech processing apparatus 100 displayed on the display 121.

The sensor 130 may include a proximity sensor (not illustrated) and an image sensor (not illustrated) for sensing a surrounding situation of the speech processing apparatus 100. The proximity sensor may acquire location data of an object (for example, the user) located around the speech processing apparatus 100 by using infrared rays or the like. Furthermore, the location data of the user acquired by the proximity sensor may be stored in the memory 160.

The image sensor may include a camera (not shown) capable of capturing an image of the surroundings of the speech processing apparatus 100, and for image-capturing efficiency, a plurality of cameras may be installed. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image but also a video formed of frames of static images. Meanwhile, the image captured and acquired by the camera serving as the image sensor may be stored in the memory 160.

In this embodiment, the sensor 130 is described as the proximity sensor and the image sensor, but the sensor 130 is not limited thereto. For example, the sensor 130 may include at least one of a lidar sensor, a weight sensor, an illumination sensor, a touch sensor, an acceleration sensor, a magnetic sensor, a G-sensor, a gyroscope sensor, a motion sensor, an RCB sensor, an infrared (IR) sensor, a finger scan sensor, an ultrasonic sensor, an optical sensor, a microphone, a battery gauge, an environmental sensor (for example, a barometer, a hygrometer, a thermometer, a radiation detection sensor, a heat detection sensor, or a gas detection sensor) and a chemical sensors (for example, an electronic nose, a healthcare sensor, or a biometric sensor). In the present embodiment, the speech processing apparatus 100 may combine various information sensed by at least two of the above-mentioned sensors, and use the combined information.

The audio input interface 141 of the audio processor 140 may receive a spoken utterance (for example, a wake-up word and a voice command) uttered by the user, and transfer the spoken utterance to the controller 170, and the controller 170 may transfer the spoken utterance uttered by the user to the speech recognition module 180. To this end, the audio input interface 141 may be provided with one or more microphones (not illustrated). Furthermore, the audio input interface 131 may be provided with a plurality of microphones (not shown) to more accurately receive a spoken utterance. Here, each of the plurality of microphones may be spaced apart from each other at different positions, and may process the received spoken utterance of the user as an electrical signal.

In some embodiments, the audio input interface 141 may use various noise removing algorithms for removing the noise generated during the process of receiving the spoken utterance. In an alternate embodiment, the audio input interface 141 may include various elements configured to process an audio signal, such as a filter (not illustrated) configured to remove noise when the user's spoken speech is received, and an amplifier (not illustrated) configured to amplify and output a signal outputted from the filter.

The audio output interface 142 in the audio processor 140 may output, as audio, an alarm sound, notification messages regarding an operation mode, an operation state, and an error state, information corresponding to a command input of the user, processing results corresponding to a command input of the user, and the like, by a control of the controller 170. The audio output interface 142 may convert electric signals from the controller 170 into audio signals, and output the audio signals. To this end, the audio output interface 142 may be provided with a speaker or the like.

In a state in which the speech recognition functionality is activated after having received the wake-up word, the information processor 150 may determine a temporary pause of reception of the first spoken utterance during reception of the first spoken utterance. The information processor 150 may output the first spoken response utterance as a result of speech recognition processing of the second spoken utterance received after the temporary pause, separately from the first spoken utterance. The information processor 150 may determine, as an extension of the first spoken utterance, the third spoken utterance received after outputting the first spoken response utterance. When performing speech recognition processing on the fourth spoken utterance obtained by combining the first spoken utterance and the third spoken utterance, the information processor 150 may delete a duplicate utterance part from the fourth spoken utterance. The information processor 150 may output the second spoken response utterance as a result of speech recognition processing of the fourth spoken utterance from which the duplicate utterance part has been deleted.

In the present embodiment, the information processor 150 may perform training in connection with the controller 170, or may receive training results from the controller 170. In this embodiment, the information processor 150 may be provided outside the controller 170 as illustrated in FIG. 2, or may be provided inside the controller 170 and operate like the controller 170, or may be provided within the server 300 of FIG. 1. Hereinafter, the information processor 150 will be described in greater detail with reference to FIG. 4.

The memory 160 may store therein various information required for operations of the speech processing apparatus 100, and may include a volatile or non-volatile recording medium. For example, the memory 160 may store a preset wake-up word for determining the presence of a wake-up word from the user's spoken utterance. The wake-up word may be set by a manufacturer. For example, "Hi, LG" may be set as the wake-up word, and the user may change the wake-up word. The wake-up word may be inputted in order to activate the speech processing apparatus 100, and the speech processing apparatus 100 that has recognized the wake-up word uttered by the user may switch to a voice recognition activation state.

Furthermore, the memory 160 may store the utterance information (wake-up word and spoken utterance) of the user received via the audio input interface 141, may store information detected by the sensor 130, and may store information processed by the information processor 150.

Furthermore, the memory 160 may store a command to be executed by the information processor 150, for example, a command for determining a temporary pause of reception of the first spoken utterance during reception of the first spoken utterance in a state in which the speech recognition functionality is activated after having received the wake-up word, a command for outputting the first spoken response utterance as a result of speech recognition processing of the second spoken utterance received after the temporary pause separately from the first spoken utterance, a command for determining, as an extension of the first spoken utterance, the third spoken utterance received after outputting the first spoken response utterance, a command for deleting, when performing speech recognition processing on the fourth spoken utterance that is obtained by combining the first spoken utterance and the third spoken utterance, a duplicate utterance part from the fourth spoken utterance, and a command for outputting the second spoken response utterance as a result of speech recognition processing of the fourth spoken utterance from which the duplicate utterance part has been deleted.

Here, the memory 160 may include a magnetic storage medium or a flash storage medium, but the scope of the present disclosure is not limited thereto. The memory 160 may include a built-in memory and/or an external memory, and may include a volatile memory such as a DRAM, an SRAM, or an SDRAM, a non-volatile memory such as a one-time programmable ROM (OTPROM), a PROM, an EPROM, an EEPROM, a mask ROM, a flash ROM, a NAND flash memory, or a NOR flash memory, a flash drive such as a solid state disk (SSD) compact flash (CF) card, an SD card, a Micro-SD card, a Mini-SD card, an Xd card, or a memory stick, or a storage device such as a HDD.

Here, relatively simple speech recognition may be performed by the speech processing apparatus 100, and relatively complex speech recognition such as natural language processing may be performed by the server 300. For example, when a word uttered by the user is a preset wake-up word, the speech processing apparatus 100 may switch to a state for receiving a spoken utterance as a voice command. Here, the speech processing apparatus 100 may perform the speech recognition process up to a stage where it is determined whether the wake-up word has been inputted, and the rest of the speech recognition process for the spoken utterance may be performed through the server 300. Since system resources of the speech processing apparatus 100 may be limited, natural language recognition and processing, which are relatively complex, may be performed by the server 300.

The controller 170 may transfer the spoken utterance received via the audio input interface 141 to the speech recognition module 180, and may provide a speech recognition processing result from the speech recognition module 180 as visual information through the display 121 or as auditory information through the audio output interface 142.

The controller 170 may control the entire operation of the speech processing apparatus 100 by driving the control software stored in the memory 160 as a kind of central processing device. The controller 170 may include any type of device capable of processing data, such as a processor. Here, the "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

In this embodiment, the controller 170 may perform machine learning such as deep learning on the spoken utterance of the user so as to enable the speech processing apparatus 100 to output an optimal result of the speech recognition processing. The memory 160 may store, for example, data used in the machine learning and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on the result of complex calculations in the brain.

Meanwhile, learning of an artificial neural network may be performed by adjusting a weight of a connection line (also adjusting a bias value, if necessary) between nodes so that a desired output is achieved with regard to a given input. Also, the artificial neural network can continuously update the weight values through learning. Furthermore, methods such as back propagation may be used in training the artificial neural network.

As described above, the controller 170 may be provided with an artificial neural network and perform machine learning-based user recognition and user's voice recognition using received audio input signals as input data.

The controller 170 may include an ANN, such as a deep neural network (DNN) including a CNN, an RNN, a DBN, and so forth, and may train the DNN. As a machine learning method for such an artificial neural network, both unsupervised learning and supervised learning may be used. The controller 170, after learning according to the setting, may control such that a speech tone recognition artificial neural network structure is updated.

In the present embodiment, the speech recognition module 180 may include the transceiver 110 for transferring a driving signal and/or various information corresponding to utterance information to the electronic device 200 and/or the server 300, the audio input interface 141 for receiving a spoken utterance, the audio output interface 142 for outputting a speech recognition processing result, and the speech recognition processor 181 for generating the speech recognition result by analyzing a voice command using a speech recognition algorithm.

In the present embodiment, the speech recognition processor 181 may include an automatic speech recognition (ASR) processor (not illustrated), a natural language understanding (NLU) processor (not illustrated), a natural language generation (NLG) processor (not illustrated), and a text-to-speech (TTS) conversion processor (not illustrated).

The automatic speech recognition processor may generate a user text obtained by converting the user's spoken utterance collected through the audio input interface 141 as a microphone into a text. In the present embodiment, the automatic speech recognition processor may perform speech-to-text (STT) conversion. In the present embodiment, the automatic speech recognition processor may include a speech recognizer (not illustrated). The speech recognizer may include an acoustic model and a language model. For example, the acoustic model may include vocalization-related information, and the language model may include unit phoneme information and information about a combination of the unit phoneme information. The speech recognizer may convert the spoken utterance of the user into the user text by using information about the unit phoneme information and the vocalization-related information. Information about the acoustic model and language model may be stored, for example, in an auto speech recognition database (not illustrated) in the auto speech recognition processor.

The natural language understanding processor may analyze an utterance intent of the user spoken utterance by performing syntactic analysis or semantic analysis on the user text. Here, the syntactic analysis may divide a query text into syntactic units (for example, words, phrases, and morphemes), and may identify syntactic elements of the divided units. In addition, the semantic analysis may be performed using semantic matching, rule matching, formula matching, and the like. Accordingly, the natural language understanding processor may recognize the intent of the user text or may acquire a parameter required for expressing the intent.

The natural language generation processor may generate, on the basis of the intent of utterance analyzed by the natural language understanding processor, a response text for the user text using a knowledge base.

The text-to-speech conversion processor may generate a spoken response utterance as a result of converting the response text, which is a natural language utterance type and generated by the natural language generation processor, into a spoken response utterance, and may output the spoken response utterance through the audio output interface 142.

Figure 3:
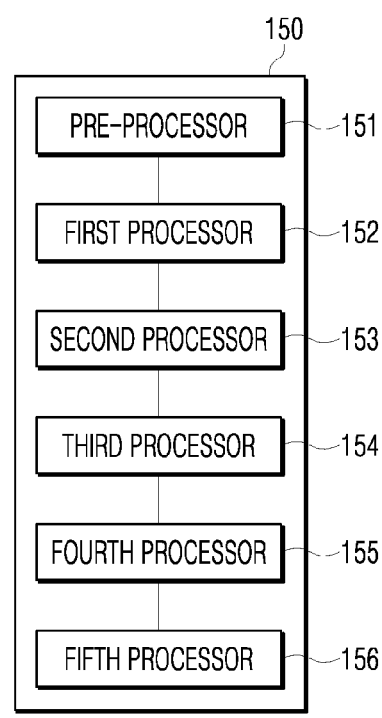
FIG. 3 is a schematic block diagram illustrating a processor of the speech processing apparatus of FIG. 2 according to an embodiment of the present disclosure.

FIG. 3 is a schematic block diagram illustrating the information processor of the speech processing apparatus of FIG. 2 according to an embodiment of the present disclosure. Hereinafter, description overlapping with that of FIGS. 1 and 2 will be omitted. Referring to FIG. 3, the information processor 150 may include a preprocessor 151, a first information processor 152, a second information processor 153, a third information processor 154, a fourth information processor 155, and a fifth information processor 156. In an alternative embodiment, the information processor 150 may include one or more processors. In an alternative embodiment, the preprocessor 151 to the fifth information processor 156 may correspond to the one or more processors. In an alternative embodiment, the preprocessor 151 to the fifth information processor 156 may correspond to software components configured to be executed by one or more processors. In the present embodiment, the information processor 150 may operate in association with the speech recognition module 180.

The preprocessor 151 may receive the wake-up word before receiving a spoken utterance to initiate a speech recognition activation state of the speech processing apparatus 100. The preprocessor 151 may convert the wake-up word uttered by the user into text, and may compare the wake-up word with a wake-up word preset in the memory 160 to determine whether the wake-up word uttered by the user is the same as the preset wake-up word. When the wake-up word uttered by the user matches the preset wake-up word as a result of the comparison, the preprocessor 151 may initiate the speech recognition activation state of the speech recognition module 180. When the wake-up word uttered by the user differs from the preset wake-up word as a result of the comparison, the preprocessor 151 may maintain a speech recognition deactivation state of the speech recognition module 180.

After the speech recognition activation state of the speech recognition module 180 is initiated, the first information processor 152 may receive a first spoken utterance through the audio input interface 141. The first information processor 152 may recognize a temporary pause signal related to reception of the first spoken utterance during reception of the first spoken utterance. The first information processor 152 may determine temporary pause of the reception of the first spoken utterance on the basis of the recognition of the temporary pause signal.

Here, the first information processor 152 may determine the temporary pause of the reception of the first spoken utterance in the manner described below. First, when a filled pause, as a non-linguistic element, is included in the first spoken utterance during reception of the first spoken utterance, the first information processor 152 may recognize the temporary pause signal related to the reception of the first spoken utterance, and may determine the temporary pause of the reception of the first spoken utterance on the basis of the recognition of the temporary pause signal. Here, the filled pause represents a meaningless filler word which is used when a person is unable to smoothly continue speaking, and may include, for example, a meaningless syllable or word such as "um", "uh", and the like. The first information processor 152 may recognize at least one word in the first spoken utterance, may compare the at least one word with words of a filled pause dictionary (not illustrated) pre-established in the memory 160, and may determine the recognized word as the temporary pause signal related to the reception of the first spoken utterance when the recognized word is the same as the word of the filled pause dictionary as a result of the comparison.

Second, when a silent delay occurs for a preset time (for example, three seconds) during reception of the first spoken utterance, the first information processor 152 may recognize the temporary pause signal related to the reception of the first spoken utterance, and may determine the temporary pause of the reception of the first spoken utterance on the basis of the recognition of the temporary pause signal.

Third, when a preset temporary pause determination keyword is included in the first spoken utterance while receiving the first spoken utterance, the first information processor 152 may recognize the temporary pause signal related to the reception of the first spoken utterance, and may determine the temporary pause of the reception of the first spoken utterance on the basis of the recognition of the temporary pause signal. Here, the memory 160 may store temporary pause determination keywords such as "just a moment". The first information processor 152 may recognize at least one word in the first spoken utterance, may compare the at least one word with the temporary pause determination keywords stored in the memory 160, and may determine the recognized word as the temporary pause signal related to the reception of the first spoken utterance when the recognized word is the same as the temporary pause determination keyword as a result of the comparison.

Upon determination of the temporary pause of the reception of the first spoken utterance, the first information processor 152 may put speech recognition processing for the first spoken utterance, which was received before the temporary pause, on standby, and may temporarily store the first spoken utterance in the memory 160. When the first information processor 152 determines the temporary pause of the reception of the first spoken utterance, the first information processor 152 may determine that there is an additional spoken utterance (second spoken utterance) requiring reception of a speech recognition processing result, in addition to the first spoken utterance. That is, the speech recognition processing for the first spoken utterance, which is processed by the first information processor 152, may be put on standby from after determination of the temporary pause of the first spoken utterance until the second information processor 153 receives the second spoken utterance.

When the first information processor 152 determines the temporary pause of the first spoken utterance, the second information processor 153 may receive the second spoken utterance, which is received after the temporary pause separately from the first spoken utterance, and may output a first spoken response utterance as a result of speech recognition processing of the second spoken utterance. After the temporary pause of the first spoken utterance, the second information processor 153 may transfer, to the speech recognition module 180, the second spoken utterance as an additional spoken utterance received via the audio input interface 141, and may receive the first spoken response utterance as a result of speech recognition processing from the speech recognition module 180, and output the first spoken response utterance through the audio output interface 142.

Here, the second information processor 153 may maintain a speech recognition activation state even after outputting a result of speech recognition processing of the second spoken utterance. A typical speech recognition processing apparatus maintains a speech recognition deactivation state until a next wake-up word is received after outputting a result of speech recognition processing of a spoken utterance. Here, according to the present embodiment, the speech recognition activation state may be maintained even after outputting a result of speech recognition processing of the second spoken utterance. This is because a spoken utterance (third spoken utterance) received after outputting a result of speech recognition processing of the additional spoken utterance (second spoken utterance) is determined to be an extension of the first spoken utterance. In more detail, the speech recognition activation state may be maintained until the fourth information processor 155 outputs a second spoken response utterance as a result of speech recognition processing of a fourth spoken utterance after the second information processor 153 outputs a result of speech recognition processing of the second spoken utterance.

After the second information processor 153 outputs the first spoken response utterance as a result of speech recognition processing of the second spoken utterance, the third spoken utterance received by the third information processor 154 via the audio input interface 141 may be determined to be an extension of the first spoken utterance.

The fourth information processor 155 may generate the fourth spoken utterance, which is obtained by combining the first spoken utterance temporarily stored in the memory 160 and the third spoken utterance received by the third information processor 154. When performing speech recognition processing on the fourth spoken utterance, the information processor 155 may delete a duplicate utterance part from the fourth spoken utterance.

The fourth information processor 155 may generate pronunciation sequences of the fourth spoken utterance, may calculate a degree of similarity between the pronunciation sequences of the fourth spoken utterance, may determine, as the duplicate utterance part, a pronunciation sequence part for which the degree of similarity between the pronunciation sequences of the fourth spoken utterance is at equal to or greater than a reference degree of similarity as a result of calculating the degree of similarity, and may then delete the duplicate part from the pronunciation sequences of the fourth spoken utterance.

Figure 5:
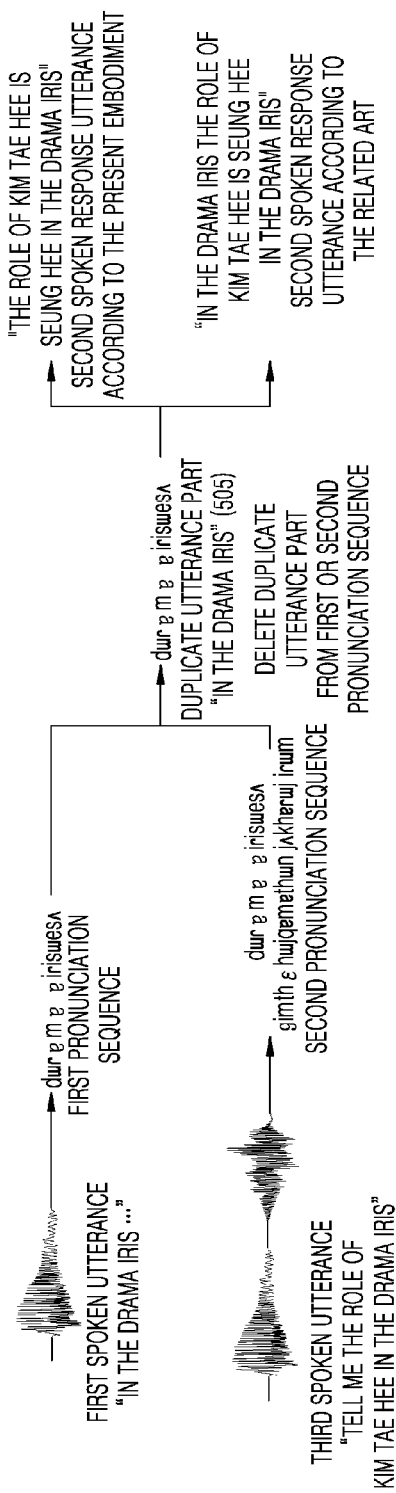
FIG. 5 is an exemplary diagram illustrating operation of an information processor which deletes a duplicate utterance part when performing speech recognition processing according to an embodiment of the present disclosure.

The fourth information processor 155 may generate the pronunciation sequences of the fourth spoken utterance using at least one of the three methods described below. Text conversion of the fourth spoken utterance, morpheme analysis, and word class tagging operation may be performed as preprocessing before generating the pronunciation sequences. For example, the fourth information processor 155 may generate a first pronunciation sequence such as 503 for the wording "in the drama Iris" which is the first spoken utterance as illustrated in FIG. 5.

Here, the pronunciation sequence generation method may include a pronunciation sequence generation method based on a phonological change rule, a statistical pronunciation sequence generation method using a pronunciation sequence dictionary, and a statistical pronunciation sequence generation method using a phonetic transcription learning DB. The pronunciation sequence generation method based on a phonological change rule may include a method of automatically generating pronunciation sequences of an input text according to a phonological rule. According to the statistical pronunciation sequence generation method using a pronunciation sequence dictionary, a pronunciation sequence dictionary is established by phonetically transcribing various text corpora, a pronunciation conversion model is generated by performing training with the pronunciation sequence dictionary using various statistical learning methods, and pronunciation sequences of an input text are generated on the basis of the pronunciation conversion model. According to this method, the difficulty of exceptional pronunciation processing and rule priority determination may be resolved. According to the statistical pronunciation sequence generation method using a phonetic transcription learning DB, pronunciation sequence conversion is performed by performing statistical training on the basis of a speaker's speech DB used in an actual synthesis system. This method has an advantage of performing allophone model or speaker dependent pronunciation conversion.

When generation of the pronunciation sequences of the fourth spoken utterance is completed, the fourth information processor 155 may calculate the degree of similarity between the pronunciation sequences of the fourth spoken utterance. In the present embodiment, the pronunciation sequences of the fourth spoken utterance may include a first pronunciation sequence of the first spoken utterance and a second pronunciation sequence of the third spoken utterance. For example, referring to FIG. 5, the first spoken utterance is "in the drama Iris", and the first pronunciation sequence is indicated by 503. Furthermore, for example, referring to FIG. 5, the third spoken utterance is "tell me the role of Kim Tae Hee in the drama Iris", and the second pronunciation sequence is indicated by 504.

Accordingly, the fourth information processor 155 may calculate the degree of similarity between the first pronunciation sequence and the second pronunciation sequence. In the present embodiment, the fourth information processor 155 may use a Levenshtein distance method to calculate the degree of similarity according to a distance between the first pronunciation sequence and a second pronunciation sequence. Here, the degree of similarity may be calculated on a phoneme-by-phoneme basis. The fourth information processor 155 may determine, as a duplicate utterance part, a pronunciation sequence part for which the degree of similarity between the first pronunciation sequence and the second pronunciation sequence is at equal to or greater than the reference degree of similarity (for example, 80%) as a result of calculating the degree of similarity. For example, referring to FIG. 5, the duplicate utterance part may be a pronunciation sequence 505 ("in the drama Iris"). When the fourth information processor 155 determines the duplicate utterance part, the fourth information processor 155 may delete the duplicate utterance part from either the first pronunciation sequence or the second pronunciation sequence.

The fifth information processor 156 may output the second spoken response utterance as a result of speech recognition processing of the fourth spoken utterance from which the duplicate utterance part has been deleted. According to the related art, for example, in the case illustrated in FIG. 4, the wording of "in the drama Iris the role of Kim Tae Hee is Seung Hee in the drama Iris" is generated as the second spoken response utterance for the fourth spoken utterance of "in the drama Iris tell me the role of Kim Tae Hee in the drama Iris", and thus the duplicate utterance part "in the drama Iris" is present. However, according to the present embodiment, the wording "the role of Kim Tae Hee is Seung Hee in the drama Iris" is generated as the second spoken response utterance. Thus, since the duplicate utterance part is not present, the spoken response utterance sounds more natural to the user, and speech recognition processing performance may be improved.

In the present embodiment, the information processor 150 and/or the controller 170 may obtain a filled pause time interval, a silent delay time interval, and a keyword time interval, and may determine a temporary pause interval from the user's spoken utterance using a deep neural network pre-trained to determine a temporary pause.

Figure 4:
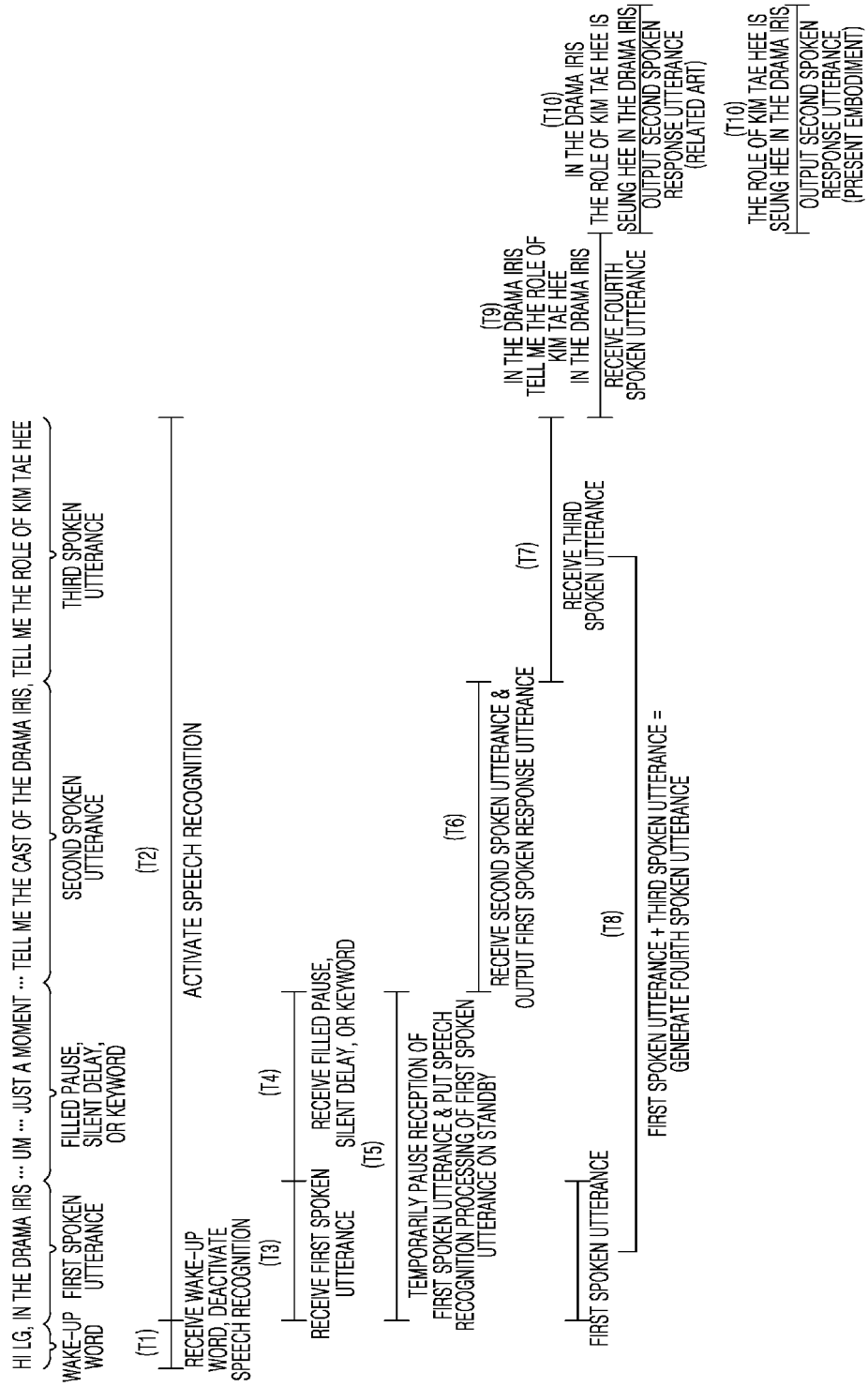
FIG. 4 is an exemplary diagram illustrating operation of an information processor for processing a user's spoken utterance according to an embodiment of the present disclosure.

FIG. 4 is an exemplary diagram illustrating operation of a processor for processing a user's spoken utterance according to an embodiment of the present disclosure. Hereinafter, descriptions overlapping with those of FIGS. 1 to 3 will be omitted. Referring to FIG. 4, it is assumed that the user's spoken utterance is "Hi LG, in the drama Iris . . . um . . . just a moment . . . tell me the cast of the drama Iris, tell me the role of Kim Tae Hee".

First, upon receiving the user's spoken utterance "Hi, LG" during a time T1, the information processor 150 may initiate the speech recognition activation state of the information processing apparatus 100 during a time T2.

The information processor 150 may receive the user's spoken utterance "in the drama Iris" (first spoken utterance) during a time T3, and thereafter may receive " . . . um . . . just a moment . . . " during a time T4. Here, "um . . . just a moment . . . " may be a filled pause and a temporary pause determination keyword, and the temporary pause of the first spoken utterance may be determined using this filled pause and temporary pause determination keyword.

During a time T5, the information processor 150 may temporarily pause the first spoken utterance, and may temporarily store the first spoken utterance ("in the drama Iris") from prior to the temporary pause in the memory 160, and may set a speech recognition processing standby state.

After temporarily storing the first spoken utterance ("in the drama Iris") from prior to the temporary pause in the memory 160, during a time T6, the information processor 150 may receive the user's spoken utterance "tell me the cast of the drama Iris" (second spoken utterance), and may output a first spoken response utterance, for example, "the cast of Iris is Lee Byung Hun, Kim Tae Hee, . . . etc.", as a result of speech recognition processing of the second spoken utterance.

The information processor 150 may maintain the speech recognition activation state after outputting the first spoken response utterance, and upon receiving the user's spoken utterance "tell me the role of Kim Tae Hee in the drama Iris" (third spoken utterance) during a time T7, the information processor 150 may generate, during a time T8, a fourth spoken utterance ("in the drama tell me the role of Kim Tae Hee in the drama Iris Iris") by combining the first spoken utterance stored in the memory 160 and the third spoken utterance received during the time T7. Here, the information processor 150 may determine that the third spoken utterance is an extension of the first spoken utterance.

During a time T9, the information processor 150 may receive the fourth spoken utterance ("in the drama Iris tell me the role of Kim Tae Hee in the drama Iris") generated by combining the first spoken utterance and the third spoken utterance.

During a time T10, when performing speech recognition processing on the fourth spoken utterance, the duplicate utterance part ("in the drama Iris") may be deleted, and a second spoken response utterance, for example, "the role of Kim Tae Hee is Seung Hee in the drama Iris", may be outputted as a result of speech recognition processing of the fourth spoken utterance from which the duplicate utterance part has been deleted.

FIG. 5 is an exemplary diagram illustrating operation of an information processor which deletes a duplicate utterance part when performing speech recognition processing according to an embodiment of the present disclosure. Hereinafter, descriptions overlapping with those of FIGS. 1 to 4 will be omitted. Referring to FIG. 5, the degree of similarity between the first pronunciation sequence 503 of the first spoken utterance 501 and the second pronunciation sequence 504 of the third spoken utterance 502 may be calculated to determine, as a duplicate utterance part 505, parts for which the degree of similarity is equal to or greater than the reference degree of similarity, and the duplicate utterance part 505 may be deleted from either the first pronunciation sequence 503 or the second pronunciation sequence 504 when generating the second spoken response utterance.

Figure 6:
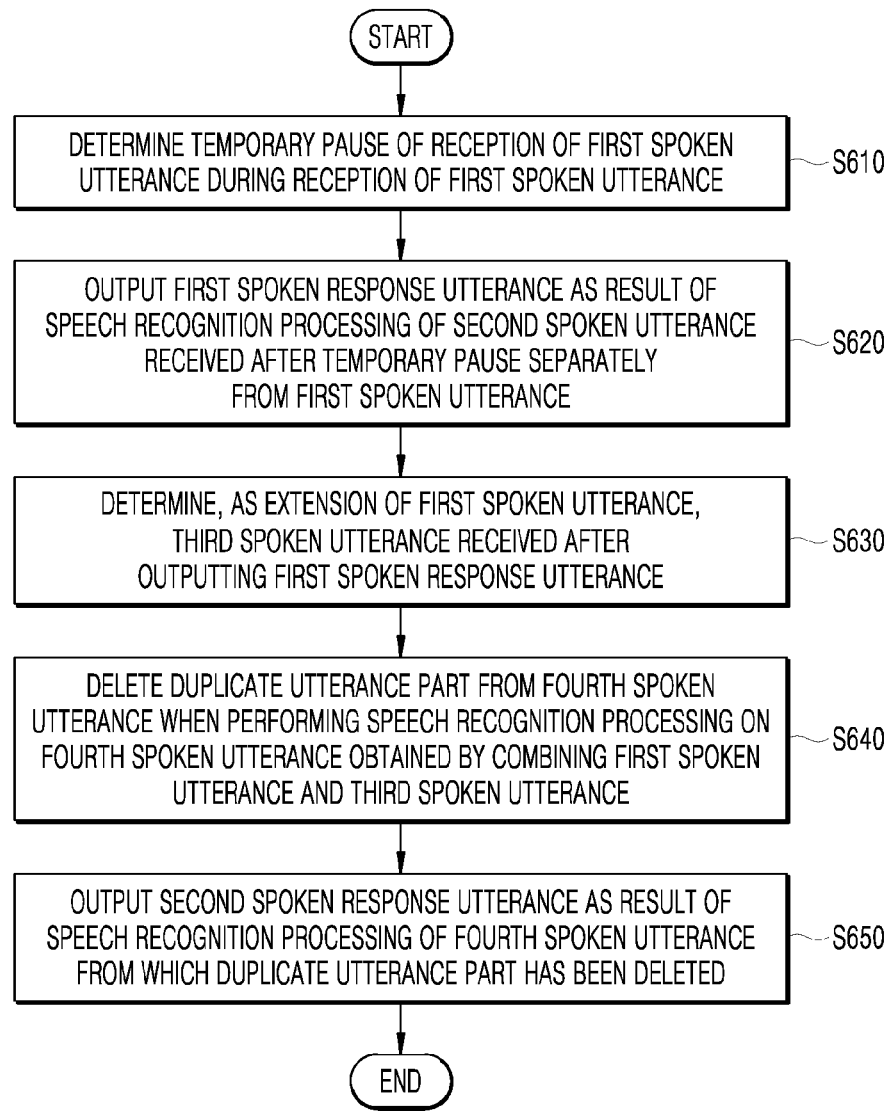
FIG. 6 is a flowchart illustrating a speech processing method according to an embodiment of the present disclosure.

FIG. 6 is a flowchart of a speech processing method according to an embodiment of the present disclosure. Hereinafter, descriptions overlapping with those of FIGS. 1 to 5 will be omitted.

Referring to FIG. 6, in operation S610, the speech processing apparatus 100 receives a first spoken utterance as a first voice command via the audio input interface 141 after initiating a speech recognition activation state by receiving a wake-up word, recognizes a temporary pause signal related to reception of the first spoken utterance during reception of the first spoken utterance, and determines the temporary pause of the first spoken utterance on the basis of the recognition of the temporary pause signal. In the present embodiment, when a filled pause, as a non-linguistic element, is included in the first spoken utterance during reception of the first spoken utterance, the speech processing apparatus 100 may determine the temporary pause of the reception of the first spoken utterance. Furthermore, when a silent delay occurs for a preset time (for example, three seconds) during reception of the first spoken utterance, the speech processing apparatus 100 may determine the temporary pause of the reception of the first spoken utterance. Furthermore, when a preset temporary pause determination keyword is included in the first spoken utterance while receiving the first spoken utterance, the speech processing apparatus 100 may determine the temporary pause of the reception of the first spoken utterance. Upon determination of the temporary pause of the reception of the first spoken utterance, the speech processing apparatus 100 may put the speech recognition processing for the first spoken utterance, which was received before the temporary pause, on standby, and may temporarily store the first spoken utterance in the memory 160. When the speech processing apparatus 100 determines the temporary pause of the reception of the first spoken utterance, the speech processing apparatus may determine that there is an additional spoken utterance (second spoken utterance) requiring reception of a speech recognition processing result, in addition to the first spoken utterance. That is, the speech recognition processing for the first spoken utterance, which is processed by the speech processing apparatus 100, may be put on standby from after the determining of the temporary pause of the first spoken utterance until the receiving of the second spoken utterance.

In operation S620, when the speech processing apparatus 100 determines the temporary pause of the first spoken utterance, the speech processing apparatus 100 receives the second spoken utterance, which is received after the temporary pause separately from the first spoken utterance, and outputs a first spoken response utterance as a result of speech recognition processing of the second spoken utterance. Here, the speech processing apparatus 100 may maintain the speech recognition activation state even after outputting the first spoken response utterance. A typical speech recognition processing apparatus maintains a speech recognition deactivation state until a next wake-up word is received after outputting a result of speech recognition processing of a spoken utterance. Here, according to the present embodiment, the speech recognition activation state may be maintained even after outputting a result of speech recognition processing of the second spoken utterance. This is because a spoken utterance (third spoken utterance) received after outputting a result of speech recognition processing of the additional spoken utterance (second spoken utterance) is determined to be an extension of the first spoken utterance.

In operation S630, the speech processing apparatus 100 determines, as an extension of the first spoken utterance, a third spoken utterance received after outputting the first spoken response utterance.

In operation S640, the speech processing apparatus 100 generates a fourth spoken utterance that is obtained by combining the first spoken utterance stored temporarily in the memory 160 and the received third spoken utterance, and deletes a duplicate utterance part from the fourth spoken utterance when performing speech recognition processing on the fourth spoken utterance. The speech processing apparatus 100 may generate pronunciation sequences of the fourth spoken utterance, and may calculate the degree of similarity between the pronunciation sequences of the fourth spoken utterance. The speech processing apparatus 100 may determine, as the duplicate utterance part, a pronunciation sequence part for which the degree of similarity between the pronunciation sequences of the fourth spoken utterance is equal to or greater than a reference degree of similarity, as a result of calculating the degree of similarity, and may delete the duplicate part from the pronunciation sequences of the fourth spoken utterance. When calculating the degree of similarity, the speech processing apparatus 100 may calculate the degree of similarity between a first pronunciation sequence included in the first spoken utterance and a second pronunciation sequence included in the third spoken utterance, among the pronunciation sequences of the fourth spoken utterance. When determining as the duplicate utterance part, the speech processing apparatus 100 may determine, as the duplicate utterance part, a pronunciation sequence part for which the degree of similarity between the first pronunciation sequence and the second pronunciation sequence is equal to or greater than the reference degree of similarity, as a result of calculating the degree of similarity. When deleting the duplicate utterance part, the speech processing apparatus 100 may delete the duplicate utterance part from either the first pronunciation sequence or the second pronunciation sequence.

In operation S650, the speech processing apparatus 100 outputs a second spoken response utterance as a result of speech recognition processing of the fourth spoken utterance from which the duplicate utterance part has been deleted.

Embodiments according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for controlling a speech processing apparatus, the method comprising:
   receiving, by a microphone of the speech processing apparatus, a first spoken utterance by a user;
   storing the first spoken utterance in a memory of the speech processing apparatus;
   determining, by a controller of the speech processing apparatus, a temporary pause of reception of the first spoken utterance during reception of the first spoken utterance;
   outputting, by a speaker device of the speech processing apparatus, a first spoken response utterance as a result of speech recognition processing of a second spoken utterance received after the temporary pause, the second spoken utterance being separate from the first spoken utterance;
   determining, by the controller, as an extension of the first spoken utterance, a third spoken utterance received after the outputting of the first spoken response utterance;
   deleting, by the controller, a duplicate utterance part from a fourth spoken utterance that is obtained by combining the first spoken utterance and the third spoken utterance, when performing speech recognition processing on the fourth spoken utterance;
   outputting, by the speaker device, a second spoken response utterance as a result of speech recognition processing of the fourth spoken utterance from which the duplicate utterance part has been deleted; and
   training, by the controller, a neural network based on the result of the speech recognition processing of the fourth spoken utterance.

2. The method of claim 1, wherein the determining the temporary pause of reception of the first spoken utterance comprises:
   recognizing a temporary pause signal related to the reception of the first spoken utterance when a filled pause, as a non-linguistic element, is included in the first spoken utterance during reception of the first spoken utterance; and
   determining the temporary pause of the reception of the first spoken utterance on the basis of the recognition of the temporary pause signal.

3. The method of claim 2, wherein the recognizing the temporary pause signal related to the reception of the first spoken utterance comprises:
   recognizing at least one word in the first spoken utterance;
   comparing the at least one word with words of a pre-established filled pause dictionary; and
   determining the at least one word as the temporary pause signal related to the reception of the first spoken utterance when the at least one word is the same as the words of the filled pause dictionary as a result of the comparison.

4. The method of claim 1, wherein the determining the temporary pause of reception of the first spoken utterance comprises determining the temporary pause of the reception of the first spoken utterance when a silent delay occurs for a preset time during reception of the first spoken utterance.

5. The method of claim 1, wherein the determining the temporary pause of reception of the first spoken utterance comprises determining the temporary pause of the reception of the first spoken utterance when a preset temporary pause determination keyword is included in the first spoken utterance during reception of the first spoken utterance.

6. The method of claim 1, further comprising putting speech recognition processing for the first spoken utterance, which was received before the temporary pause, on standby, upon determination of the temporary pause of the reception of the first spoken utterance.

7. The method of claim 1, wherein the deleting the duplicate utterance part from the fourth spoken utterance comprises:
  generating pronunciation sequences of the fourth spoken utterance;
  calculating a degree of similarity between the pronunciation sequences of the fourth spoken utterance;
  determining, as the duplicate utterance part, a pronunciation sequence part for which the degree of similarity between the pronunciation sequences of the fourth spoken utterance is equal to or greater than a reference degree of similarity, as a result of calculating the degree of similarity; and
  deleting the duplicate part from the pronunciation sequences of the fourth spoken utterance.

8. The method of claim 7, wherein the calculating the degree of similarity comprises calculating the degree of similarity between a first pronunciation sequence included in the first spoken utterance and a second pronunciation sequence included in the third spoken utterance, among the pronunciation sequences of the fourth spoken utterance.

9. The method of claim 8, wherein the determining as the duplicate utterance part comprises determining, as the duplicate utterance part, a pronunciation sequence part for which the degree of similarity between the first pronunciation sequence and the second pronunciation sequence is equal to or greater than the reference degree of similarity, as a result of calculating the degree of similarity.

10. The method of claim 9, wherein the deleting the duplicate utterance part comprises deleting the duplicate utterance part from either the first pronunciation sequence or the second pronunciation sequence.

11. A speech processing apparatus comprising:
  a microphone configured to sense spoken utterances from a user;
  a memory configured to store the spoken utterances;
  a speaker device configured to output at least one audio response corresponding to one or more of the spoken utterances; and
  a controller configured to:
    receive, via the microphone, a first spoken utterance by the user;
    store the first spoken utterance in the memory;
    determine a temporary pause of reception of a first spoken utterance during reception of the first spoken utterance;
    output, via the speaker device, a first spoken response utterance as a result of speech recognition processing of a second spoken utterance received after the temporary pause separately from the first spoken utterance;
    determine, as an extension of the first spoken utterance, a third spoken utterance received after the output of the first spoken response utterance;
    delete a duplicate utterance part from a fourth spoken utterance that is obtained by combining the first spoken utterance and the third spoken utterance, when performing speech recognition processing on the fourth spoken utterance;
    output, via the speaker device, a second spoken response utterance as a result of speech recognition processing of the fourth spoken utterance from which the duplicate utterance part has been deleted; and
    train a neural network based on the result of the speech recognition processing of the fourth spoken utterance.

12. The speech processing apparatus of claim 11, wherein the controller is configured to, when performing the determining the temporary pause of the reception of the first spoken utterance, recognize a temporary pause signal related to the reception of the first spoken utterance when a filled pause, as a non-linguistic element, is included in the first spoken utterance during reception of the first spoken utterance, and
  wherein the determining the temporary pause of the reception of the first spoken utterance is based on the recognition of the temporary pause signal.

13. The speech processing apparatus of claim 12, wherein the controller is configured to, when recognizing the temporary pause signal, recognize at least one word in the first spoken utterance, compare the at least one word with words of a pre-established filled pause dictionary, and determine the at least one word as the temporary pause signal when the at least one word is the same as one or more words of the filled pause dictionary as a result of the comparison.

14. The speech processing apparatus of claim 11, wherein the controller is configured to, perform the determining the temporary pause of the reception of the first spoken utterance when a silent delay occurs for a preset time during reception of the first spoken utterance.

15. The speech processing apparatus of claim 11, wherein the controller is configured to, perform the determining the temporary pause of the reception of the first spoken utterance when a preset temporary pause determination keyword is included in the first spoken utterance during reception of the first spoken utterance.

16. The speech processing apparatus of claim 11, wherein the controller is further configured to put speech recognition processing for the first spoken utterance, which was received before the temporary pause, on standby, upon the determining the temporary pause of the reception of the first spoken utterance.

17. The speech processing apparatus of claim 11, wherein the controller is configured to, when performing the deleting the duplicate utterance part from the fourth spoken utterance, generate pronunciation sequences of the fourth spoken utterance, calculate a degree of similarity between the pronunciation sequences of the fourth spoken utterance, determine, as the duplicate utterance part, a pronunciation sequence part for which the degree of similarity between the pronunciation sequences of the fourth spoken utterance is equal to or greater than a reference degree of similarity, as a result of calculating the degree of similarity, and delete the duplicate part from the pronunciation sequences of the fourth spoken utterance.

18. The speech processing apparatus of claim 17, wherein the controller is configured to, when calculating the degree of similarity, calculate the degree of similarity between a first pronunciation sequence included in the first spoken utterance and a second pronunciation sequence included in the third spoken utterance among the pronunciation sequences of the fourth spoken utterance.

19. The speech processing apparatus of claim 18, wherein the controller is configured to, determine, as the duplicate utterance part, a pronunciation sequence part for which the degree of similarity between the first pronunciation sequence and the second pronunciation sequence is equal to or greater than the reference degree of similarity, as a result of calculating the degree of similarity.

20. The speech processing apparatus of claim 19, wherein the deleting the duplicate utterance part includes deleting the duplicate utterance part from either the first pronunciation sequence or the second pronunciation sequence.

* * * * *